(12) United States Patent
Dettinger et al.

(10) Patent No.: US 6,741,173 B2
(45) Date of Patent: May 25, 2004

(54) DISTRIBUTED ALARM SYSTEM

(75) Inventors: Richard Dean Dettinger, Rochester, MN (US); Frederick Allyn Kulack, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 10/056,557

(22) Filed: Jan. 25, 2002

(65) Prior Publication Data

US 2003/0141970 A1 Jul. 31, 2003

(51) Int. Cl.[7] .................................................. G08B 1/08
(52) U.S. Cl. .................. 340/533; 340/524; 340/825.36; 340/825.49; 340/286.02
(58) Field of Search ................................ 340/502, 506, 340/508, 524, 520, 565, 825.19, 825.36, 825.49, 286.02

(56) References Cited

U.S. PATENT DOCUMENTS

| | | | | |
|---|---|---|---|---|
| 5,532,680 A | * | 7/1996 | Ousborne | 340/567 |
| 5,781,108 A | * | 7/1998 | Jacob et al. | 340/552 |
| 5,991,240 A | | 11/1999 | Van Ryzin | 368/47 |

* cited by examiner

*Primary Examiner*—Daryl Pope
(74) *Attorney, Agent, or Firm*—Moser, Patterson & Sheridan, LLP (57) ABSTRACT

The present invention generally is directed to an alarm device that includes a network interface configured to receive an alarm control signal, an alarm interface for issuing an alarm to a target, and a processing unit which, upon receiving the alarm control signal, executes alarm issuing instructions causing the alarm interface to issue the alarm. The processing unit is configured to execute the alarm issuing instructions only after a presence of the target is detected proximate to the alarm device.

26 Claims, 9 Drawing Sheets

DISTRIBUTED ALARM SYSTEM

BACKGROUND OF THE INVENTION

1. Field of the Invention

The present invention generally relates to an alarm device, and more particularly, to alarm control signal processing.

2. Description of the Related Art

Conventional alarm devices come with several features. For example, it is known that when an alarm is activated, instead of a conventional buzzer, a radio station may be tuned. In such alarm devices, the volume of the selected radio station may gradually increase after the alarm is triggered if the alarm device is not turned off immediately. Another feature typically found in alarm devices of this type is battery-backup. A 9-volt battery, for example, provides power to the internal circuits in the alarm device during power outage.

While the above features certainly add convenience as well as combine the utilitarian features of alarm devices with entertainment, such alarm devices lack the feature of an alarm in a location different from the location in which it was set. Often times, after a person sets an alarm in one location (room), the person leaves the room to go to another room. When the alarm finally goes off, the person is not able to hear the alarm.

Consequently, a need exists for an alarm device, method or system that has the intelligence of automatically issuing an alarm in a different location than the location in which it was set.

SUMMARY OF THE INVENTION

The present invention generally is directed to an alarm device that includes a network interface configured to receive an alarm control signal, an alarm interface for issuing an alarm to a target (intended recipient), and a processing unit which, upon receiving the alarm control signal, executes alarm issuing instructions causing the alarm interface to issue the alarm. The processing unit is configured to execute the alarm issuing instructions only after a presence of the target is detected proximate to the alarm device.

Another embodiment of the present invention is directed to a method of processing an alarm control signal in an alarm device. An alarm control signal is first received. The alarm control signal indicates that an alarm issuance to a target is requested. The next step is to detect the target whether it is proximate to the alarm device in response to the receipt of the alarm control signal. An alarm is then issued to the target if the target is detected as being proximate to the alarm device.

Another embodiment of the present invention is directed to a clustered alarm system. The system includes: an alarm control signal origination device for originating an alarm control signal; and one or more alarm devices communicably linked to the alarm control signal origination device. Each alarm device has a network interface configured to receive the alarm control signal; an alarm interface for issuing an alarm to a target; a detector for detecting the target; and a processing unit which, upon receiving the alarm control signal, executes alarm issuing instructions causing the alarm interface to issue the alarm. The processing unit is configured to execute the alarm issuing instructions when the detector detects the target.

Another embodiment of the present invention is directed to a computer program for processing an alarm control signal in an alarm device. The computer program includes a code segment for receiving an alarm control signal indicating that an alarm issuance to a target is requested and a code segment for issuing an alarm to the target. In another embodiment, the computer program includes a code segment for detecting whether the target is proximate to the alarm device in response to the receipt of the alarm control signal; and a code segment for issuing an alarm to the target if the target is detected as being proximate to the alarm device.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally is directed to a method of issuing an alarm to a target (intended recipient) by an alarm device that is remote from the alarm device at which the alarm was set. More specifically, the alarm device includes a network interface configured to receive an alarm control signal, an alarm interface for issuing an alarm to a target, and a processing unit which, upon receiving the alarm control signal, executes alarm issuing instructions causing the alarm interface to issue the alarm. The processing unit is configured to execute the alarm issuing instructions only after a presence of the target is detected proximate to the alarm device. The alarm device may further include a detector for detecting the presence of the target. Alternatively, the detector may be separate from the alarm device.

The alarm device may also be part of a clustered alarm system that includes an alarm control signal origination device for originating an alarm control signal, a cluster of alarm devices, and a cluster of distributors communicably linked to the alarm control signal origination device and the alarm devices. The distributors are configured to receive and forward signals to and from the alarm control signal origination device or the alarm device.

One embodiment of the invention is implemented as a program product for use with a clustered alarm system such as, for example, the clustered alarm system 100 shown in FIG. 1 and described below. The program(s) of the program product defines functions of the embodiments (including the methods described below with reference to FIGS. 4–9) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
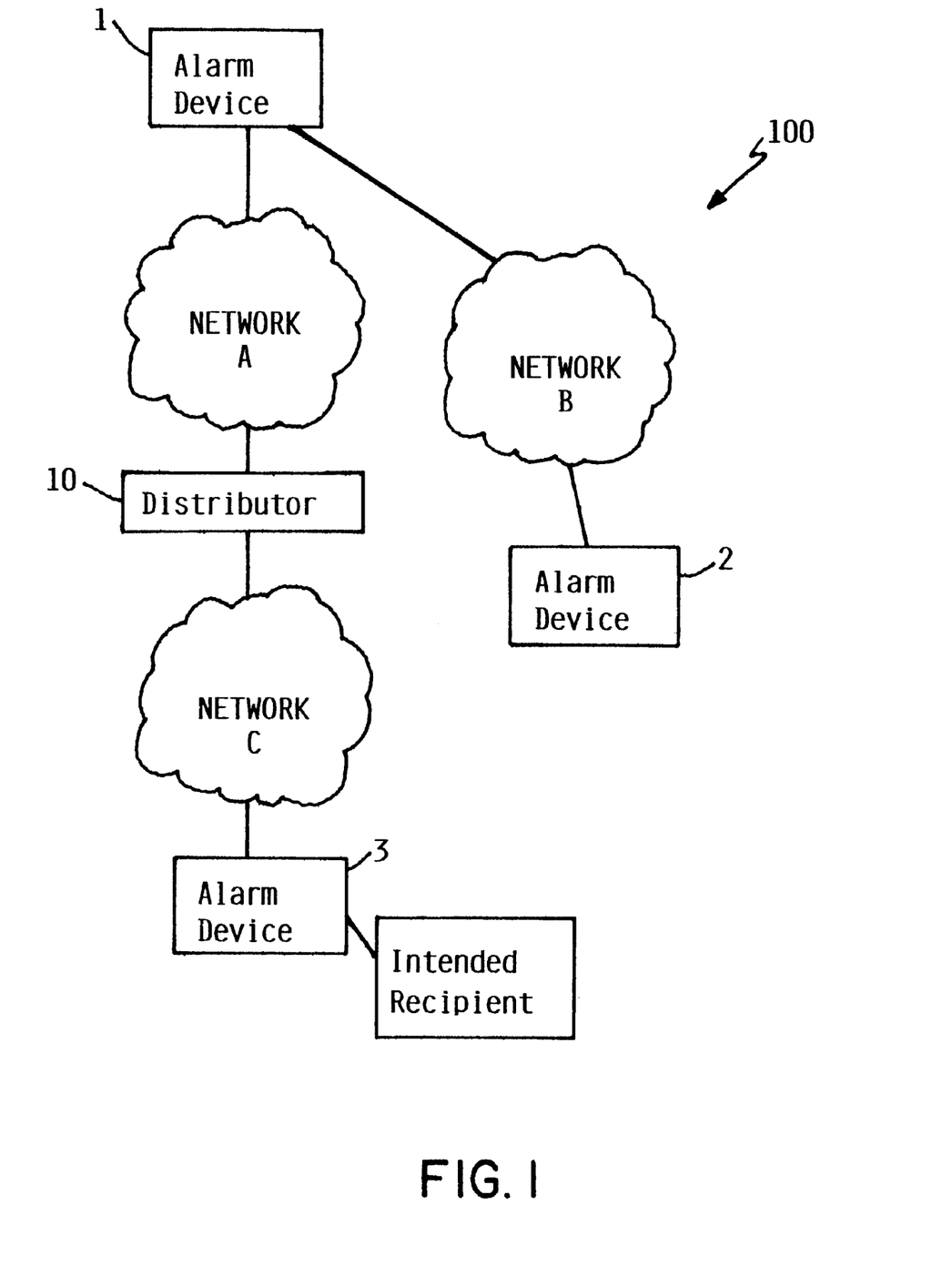
FIG. 1 is a block diagram of a clustered alarm system in accordance with an embodiment of the present invention.

Referring now to FIG. 1, a block diagram of a clustered alarm system 100 in accordance with an embodiment of the present invention is shown. The system 100 may include one or more alarm devices. As shown in FIG. 1, the system 100 includes alarm device 1, alarm device 2 and alarm device 3. The system 100 may also include one or more distributors. For simplicity, only a single distributor 10 is shown for system 100. The alarm devices and the distributors are communicably linked to each other. As shown in FIG. 1, alarm device 1 is communicably linked to alarm device 2 through network B and to distributor 10 through network A. Distributor 10 is communicably linked to alarm device 3 through network C. Various technology used for the network may include wireless or wired technology, the Internet, and virtual private network technology. The network may further include various network configuration identifiers, such as TCP/IP subnet mask and 802.11 Service Set Identifier (SSID). Various alarm device embodiments in accordance with the present invention may include clocks, wrist watches, personal digital assistant ("PDA") devices, televisions, cellular phones, and computers. The embodiments of the present invention, however, are not limited by the examples given above. Further, not all the devices 1, 2 and 3 need be alarm devices. In some cases, the devices 1, 2 and 3 are configured only for inputting/setting an alarm entry which will cause an alarm at a remote device 1, 2 or 3.

Figure 2:
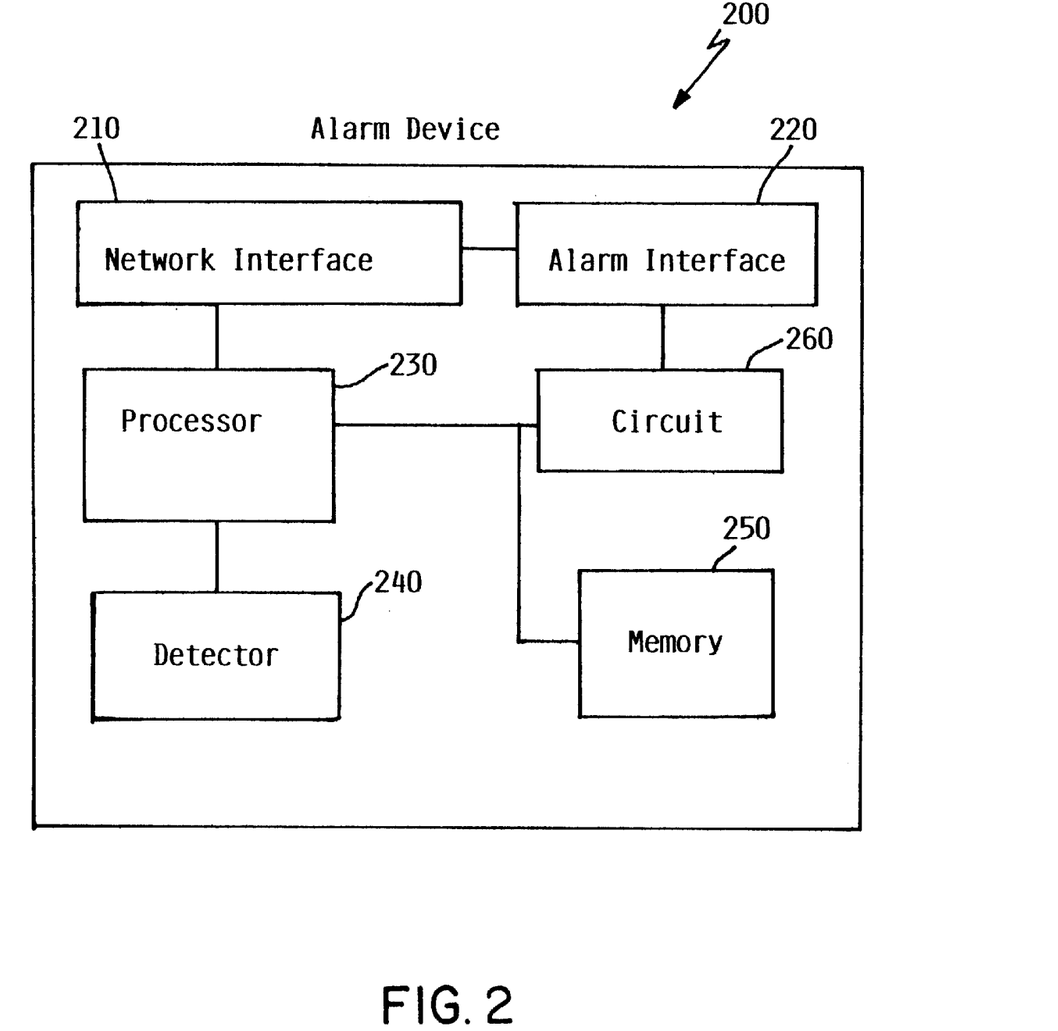
FIG. 2 is a block diagram illustrative of an alarm device in accordance with an embodiment of the present invention.

Referring now to FIG. 2, a block diagram illustrative of an alarm device 200 in accordance with an embodiment of the present invention is shown. The alarm device 200 includes a network interface 210, an alarm interface 220, a computer processor 230, a detector 240, and a memory 250. In accordance with an embodiment of the present invention, the network interface 210 is configured to receive an alarm control signal. The network interface 210 may be a Bluetooth™ wireless interface, an 802.11 wireless interface or an Ethernet wired interface. The alarm interface 220 is configured to issue an alarm to a target, e.g., a human being. The issued alarm may be auditory, tactile (e.g., by vibration), visual (e.g., television), or textual (e.g., PDA). The processor 230 is configured to execute alarm issuing instructions causing the alarm interface 220 to issue the alarm upon receiving the alarm control signal. The processor 230, however, is configured to execute the alarm issuing instructions only after a presence of the target is detected proximate to the alarm device 200. The detector 240 is configured to detect the presence of the target proximate the alarm device 200. In one embodiment, the detector 240 generates a detection signal indicating the presence of the target. The detector 240 may employ technology involving facial recognition, identification using radio frequency, active or passive ID tags worn by the target, motion detection and wireless devices. The embodiments of the present invention, however, are not limited by the examples given above. In one embodiment, the alarm device 200 includes a detector interface configured to receive the detection signal. In accordance with another embodiment, the detector 240 is separate from the alarm device 200. For instance, the detector 240 may be a global positioning satellite. In this embodiment, the detector 240 is configured to detect the presence of the target and cause the issuance of the alarm control signal.

In one embodiment, the alarm device 200 includes a circuit 260 to originate the alarm control signal. In this manner, any alarm device can originate the alarm control signal and issue the alarm associated with the signal to the target. This design allows one alarm device to originate the alarm control signal and another alarm device to issue the alarm to the target. In an embodiment, the alarm device that originates the alarm control signal is referred to as the alarm control signal origination device. The alarm control signal is typically originated when an alarm is activated or triggered. In yet another embodiment, the alarm control signal includes configuration information, such as, the device that originated the alarm control signal, the time that the alarm occurred, and a timeout value for the signal. A timeout value is defined as the length of time in which the alarm control signal has to be acknowledged. If the alarm control signal is not acknowledged within the timeout value, the alarm is terminated. This situation would occur, for instance, when the target is out of the clustered alarm system. The alarm device 200, of course, may include other components that perform typical functions of an alarm device, e.g., setting one or more alarms and keeping time (clock). In another embodiment, the alarm device 200 includes a program for setting an alarm according to various schedules, e.g., work schedule. In yet another embodiment, the alarm device 200 includes a circuit by which the alarm can be terminated using voice recognition technology.

Figure 3:
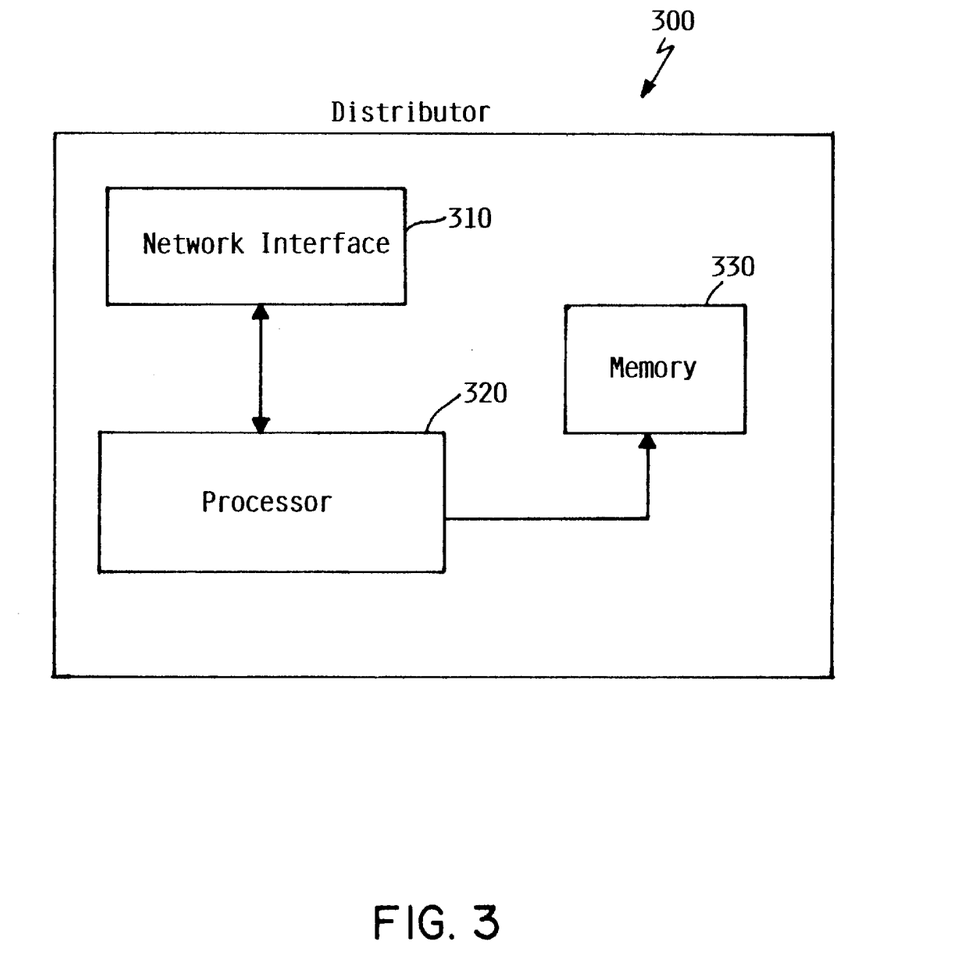
FIG. 3 is a block diagram illustrative of a distributor in accordance with an embodiment of the present invention.

Referring now to FIG. 3, a block diagram illustrative of a distributor 300 in accordance with an embodiment of the present invention is shown. In one embodiment, the distributor 10 includes a network interface 310, a processor 320 and a memory 330. The network interface 310 is configured to receive and forward signals from/to alarm devices and other distributors in the system 100. The processor 320 is configured to process signals, e.g., the alarm control signal and the acknowledgment signal, received by the distributor 300. The memory 330 is for storing information associated with the signals, e.g., configuration information and state values.

Figure 4:
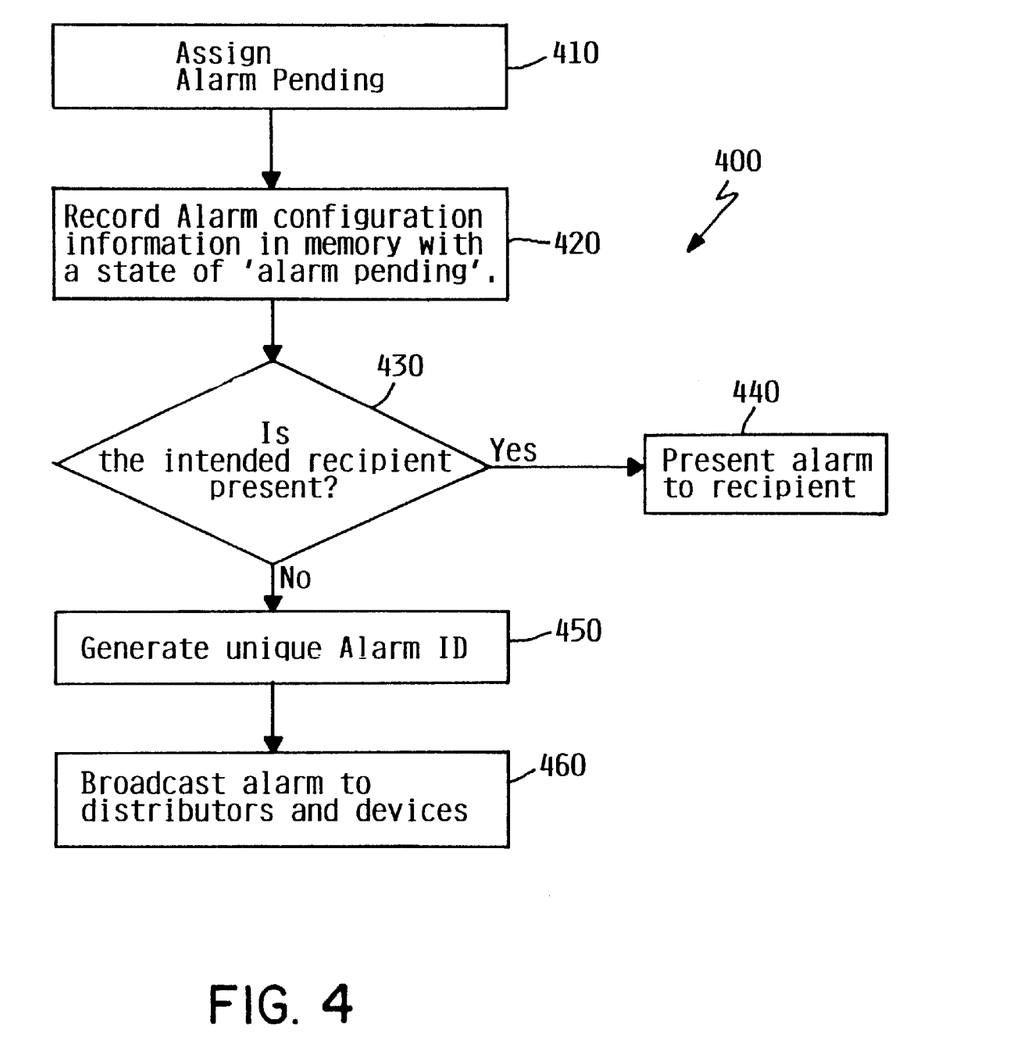
FIG. 4 is a flowchart illustrative of a method of processing an alarm control signal by an alarm device in accordance with an embodiment of the present invention.

Referring now to FIG. 4, a flowchart illustrative of a method 400 of processing an alarm control signal by an alarm device in accordance with an embodiment of the present invention is shown. When the network interface 210 receives an alarm control signal, the processor 230 assigns a state value of alarm pending to the alarm control signal, as shown in block 410. The processor 230 then stores the configuration information associated with the alarm control and the alarm pending state value in the memory 250, as shown in block 420. The detector 240 then determines whether the target is proximate the alarm device 200, as shown in block 430. If the target is detected to be proximate the alarm device 200, then the processor 230 executes the alarm issuing instructions causing the alarm interface 220 to issue the alarm to the target, as shown in block 440. On the other hand, if the target is detected as being not proximate to the alarm device 200, the network interface 210 then broadcasts the alarm control signal along with its configuration information and state value of alarm pending to the distributors and other alarm devices in the clustered alarm system, e.g., system 100, as shown in block 460. In another embodiment, the processor 230 generates a unique identifier associated with the alarm control signal, as shown in block 450. The identifier is designed to track the alarm control signal during the life of that signal, i.e., until the alarm associated with that signal is terminated. After generating the identifier, the network interface 210 then broadcasts the identifier, the alarm control signal configuration information and the state value of alarm pending to the distributors and other alarm devices in the clustered alarm system, e.g., system 100, as shown in block 460.

Figure 5:
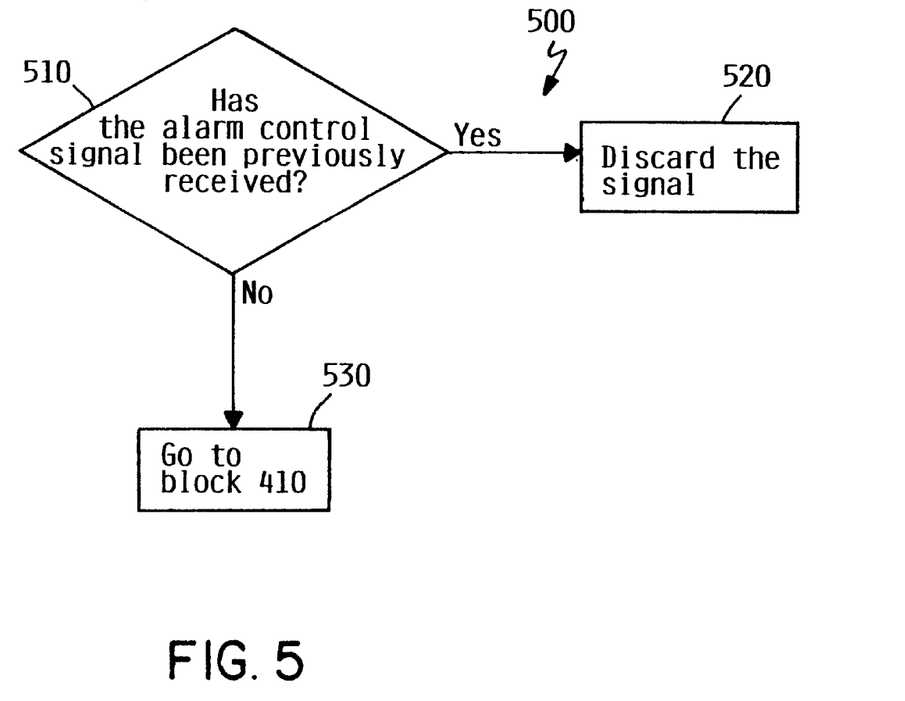
FIG. 5 is a flowchart illustrative of a method of processing an alarm control signal by an alarm device when the alarm device receives the alarm control signal from the clustered alarm system in accordance with an embodiment of the present invention.

Referring now to FIG. 5, a flowchart illustrative of a method 500 of processing an alarm control signal by an alarm device when the alarm device receives the alarm control signal from the clustered alarm system, e.g., network C, in accordance with an embodiment of the present invention is shown. When the network interface 210 receives an alarm control signal from the system, the processor 230 determines whether this alarm control signal has previously been received by the alarm device 200, as shown in block 510. In one embodiment, the processor 230 determines whether that configuration information associated with that particular alarm control signal is stored in the memory 250. If the answer is affirmative, the processor 230 then ignores the alarm control signal, i.e., the alarm control signal is discarded, as shown in block 520. On the other hand, if the answer is negative, then the alarm control signal is processed according to the method illustrated in FIG. 4, as shown in block 530.

Figure 6:
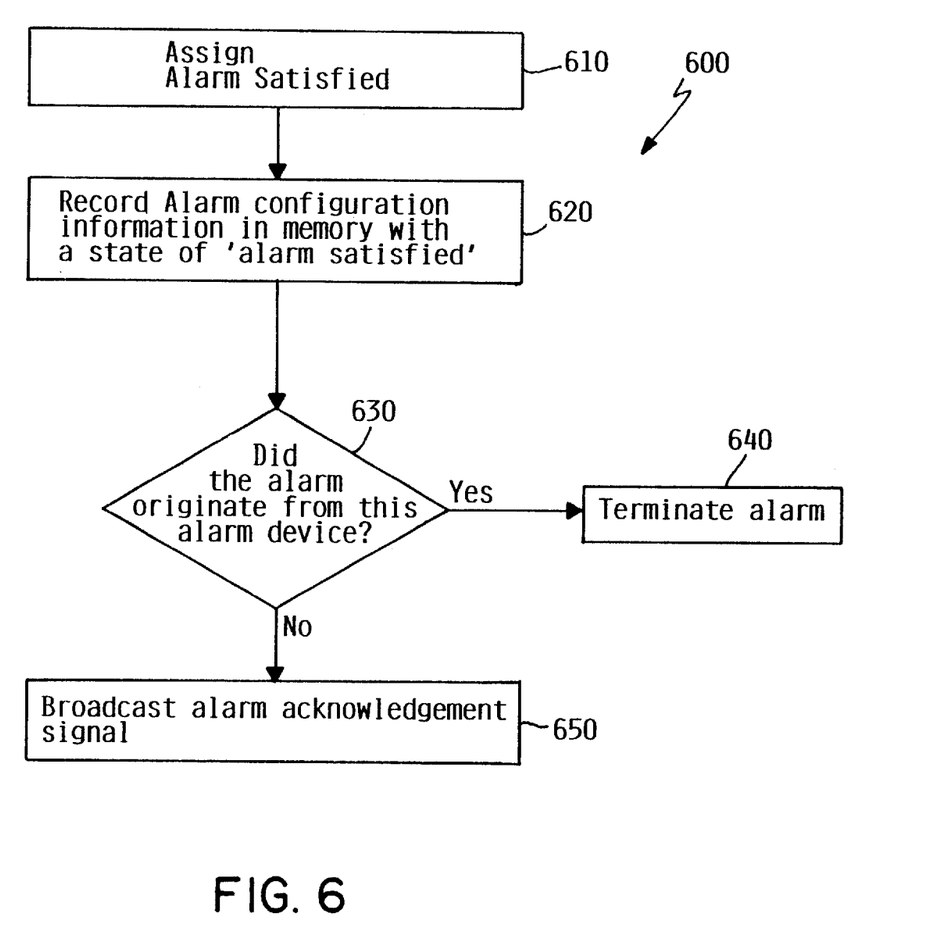
FIG. 6 is a flowchart illustrative of a method of processing an acknowledgment signal by an alarm device in response to an acknowledgment from the target in accordance with an embodiment of the present invention.

Once an alarm has been issued to the target by a nearby alarm device 200, the alarm device 200 waits for an acknowledgment from the target. A flowchart illustrative of a method 600 of processing an acknowledgment from the target by the alarm device in accordance with an embodiment of the present invention is shown in FIG. 6. When the network interface 210 receives an acknowledgment signal in response to the target acknowledging the alarm, the processor 230 assigns a state value of alarm satisfied to the alarm control signal, as shown in block 610. The processor 230 then stores the configuration information associated with the alarm control and the alarm satisfied state value in the memory 250, as shown in block 620. The processor 230 then determines whether the alarm control signal was originated by the alarm device 200, as shown in block 630. If the answer is affirmative, the alarm is then terminated, as shown in block 640. On the other hand, if the answer is negative, the network interface 210 then broadcasts the acknowledgment signal along with the alarm control signal configuration information and state value of alarm satisfied to the distributors and other alarm devices in the clustered alarm system, e.g., system 100, as shown in block 650.

Figure 7:
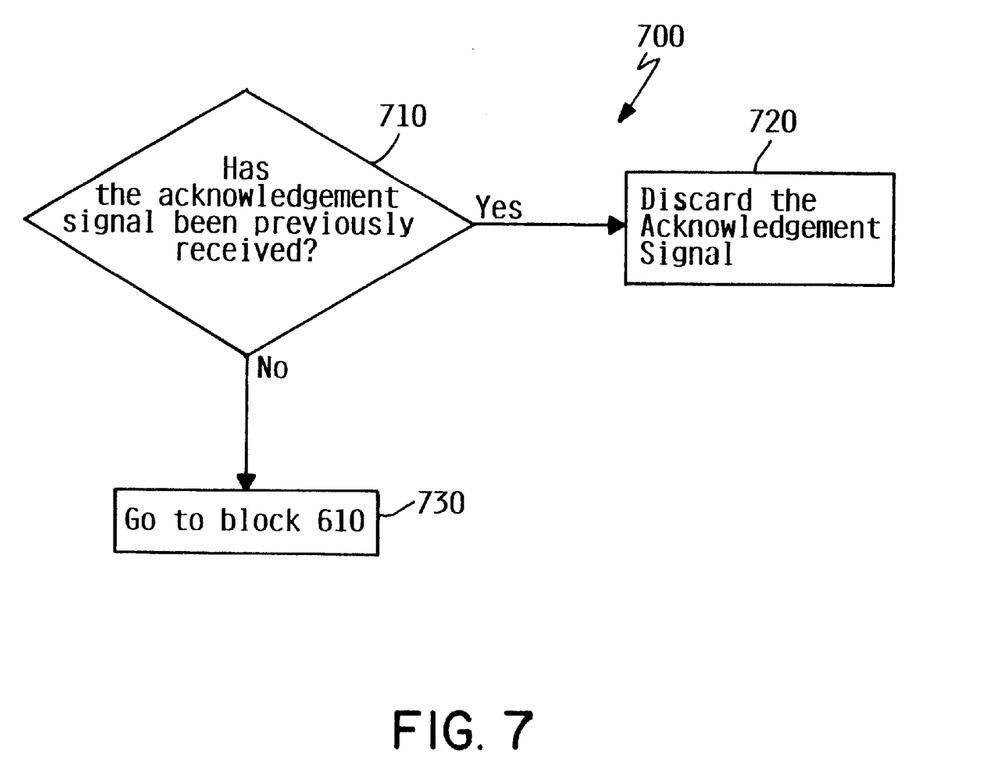
FIG. 7 is a flowchart illustrative of a method of processing an acknowledgment signal received by the alarm device from the system in accordance with an embodiment of the present invention.

FIG. 7 is a flowchart illustrative of a method 700 of processing an acknowledgment signal received by the alarm device from the system 100 in accordance with an embodiment of the present invention. When the network interface 210 receives an acknowledgment signal from the system 100, e.g., a distributor or another alarm device, the processor 230 determines whether this acknowledgment signal has previously been received by the alarm device 200, as shown in block 710. If the answer is affirmative, the processor 230 then ignores the acknowledgment signal, i.e., the acknowledgment signal is discarded, as shown in block 720. On the other hand, if the answer is negative, then the acknowledgment signal is processed according to the method illustrated in FIG. 6, as shown in block 730.

Figure 8:
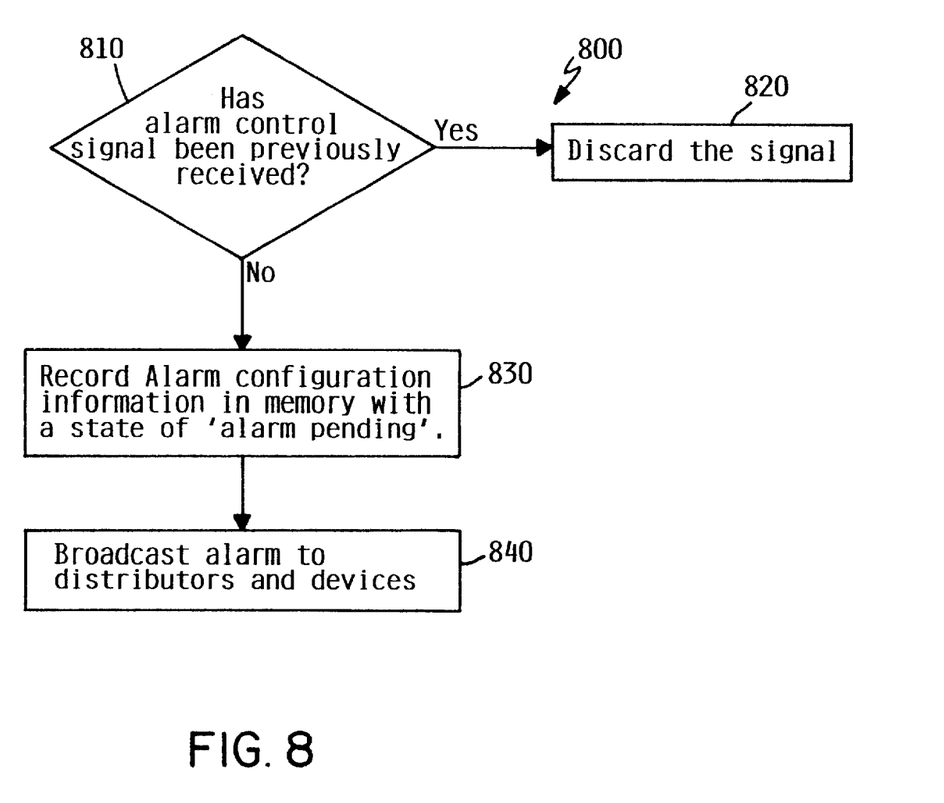
FIG. 8 is a flowchart illustrative of a method of processing an alarm control signal by a distributor in accordance with an embodiment of the present invention.

Referring now to FIG. 8, a flowchart illustrative of a method 800 of processing an alarm control signal by a distributor 300 in accordance with an embodiment of the present invention is shown. When the network interface 310 receives an alarm control signal from the system, the processor 320 determines whether this alarm control signal has previously been received by the distributor 300, as shown in block 810. If the answer is affirmative, the processor 320 then ignores the alarm control signal, i.e., the alarm control signal is discarded, as shown in block 820. On the other hand, if the answer is negative, the processor 320 then stores the configuration information associated with the alarm control signal and the alarm pending state value in the memory 330, as shown in block 830. The network interface 210 then broadcasts the alarm control signal along with its configuration information and state value of alarm pending to other distributors and alarm devices in the clustered alarm system, e.g., system 100, as shown in block 840.

Figure 9:
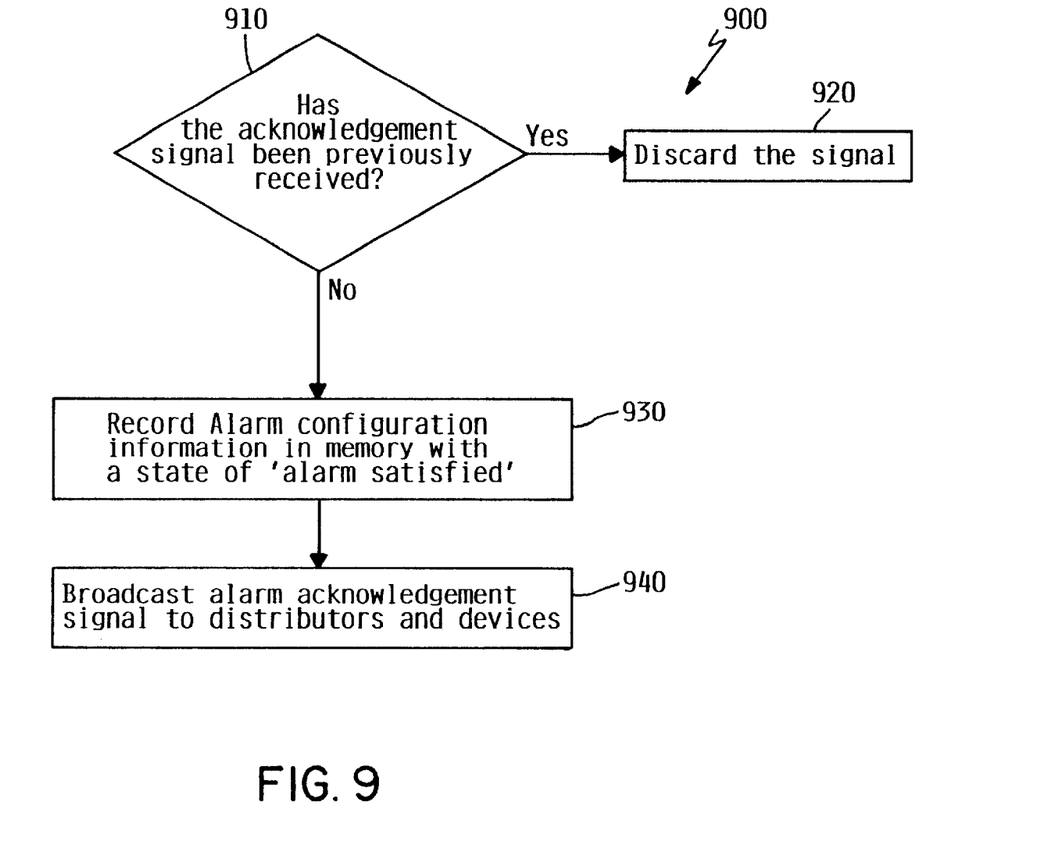
FIG. 9 is a flowchart illustrative of a method of processing an acknowledgment signal by a distributor in accordance with an embodiment of the present invention.

Referring now to FIG. 9, a flowchart illustrative of a method 900 of processing an acknowledgment signal by a distributor 300 in accordance with an embodiment of the present invention is shown. When the processor 320 receives an acknowledgment signal from the system, the processor 320 determines whether this acknowledgment signal has previously been received by the distributor 300, as shown in block 910. If the answer is affirmative, the processor 320 then ignores the acknowledgment signal, i.e., the acknowledgment signal is discarded, as shown in block 920. On the other hand, if the answer is negative, the processor 320 then stores the configuration information associated with the alarm control signal and the alarm satisfied state value in the memory 330, as shown in block 930. The network interface 210 then broadcasts the alarm control signal along with its configuration information and state value of alarm satisfied to other distributors and alarm devices in the clustered alarm system, e.g., system 100, as shown in block 940.

While the foregoing is directed to embodiments of the present invention, other and further embodiments of the invention may be devised without departing from the basic scope thereof, and the scope thereof is determined by the claims that follow.

What is claimed is:

1. A method of processing en alarm control signals in network of alarm devices, comprising:
   receiving an alarm selling by a first networked alarm device capable of issuing alarms to human beings, and wherein the alarm setting is input to the first networked alarm device by a human being and is configured to cause an alarm to be issued at a specified time, as determined on the basis of a clock, and for the purpose of notifying the human being the that the specified time has arrived;
   at the specified time, detecting whether the human being is proximate to the first networked alarm device;
   if the human being is proximate to the first networked alarm device, issuing an alarm from the first networked alarm device to the human being;
   if the human being is not proximate to the first networked alarm device, issuing an alarm control signal over a network connection indicating that an alarm issuance to the human being is requested;
   receiving the alarm control signal by a second networked alarm device;
   detecting whether the human being is proximate to the second networked alarm device in response to the receipt of the alarm control signal; and
   issuing an alarm to the human being if the human being is detected as being proximate to the second networked alarm device.

2. An apparatus, comprising:
   an alarm device, comprising:
      a network interface configured to receive an alarm control signal initiated on the basis of an alarm selling entered by a human being into a networked remote alarm device capable of issuing alarms, and wherein the alarm setting is configured to cause an alarm to be issued at a specified time, as determined on the basis of a clock, and for the purpose of notifying the human being the that the specified time has arrived;
      an alarm interface for issuing en the alarm to a-target human being; and
      a processing unit which, upon receiving the alarm control signal, executes alarm issuing instructions causing the alarm interface to issue the alarm; and wherein the processing unit is configured to execute the alarm issuing instructions only after a presence of the human being is detected proximate to the alarm device.

3. The apparatus of claim 2, wherein the alarm control signal is from an alarm control signal origination device communicably linked to the alarm device.

4. The apparatus of claim 3, further comprising a remotely located detector configured to detect the presence of the human being and configured to cause the alarm control signal origination device to issue the alarm control signal in response to detecting the presence of the human being.

5. The apparatus of claim 2, wherein the alarm device further comprises a detector interface configured to receive a detection signal indicating the presence of the human being.

6. The apparatus of claim 5, wherein the alarm device further comprises a detector configured to generate the detection signal.

7. The apparatus of claim 3, further comprising a distributor communicably linked between the alarm device and the alarm control signal origination device, the distributor being configured to receive the alarm control signal from the alarm control signal origination device and forward the alarm control signal to the alarm device.

8. The apparatus of claim 2, wherein the alarm device further comprising a circuit for generating the alarm control signal.

9. An apparatus, comprising:
   an alarm device, comprising:
      an alarm interface for issuing an alarm to a target;
      a network interface configured to receive an alarm control signal and further configured to receive an acknowledgment signal indicating that the target has acknowledged the alarm; and
      a processing unit which, upon receiving the alarm control signal, executes alarm issuing instructions causing the alarm interface to issue the alarm; and wherein the processing unit is configured to execute the alarm issuing instructions only after a presence of the target is detected proximate to the alarm device.

10. The apparatus of claim 9, wherein the alarm control signal is from an alarm control signal origination device communicably linked to the alarm device; and wherein the network interface is further configured to forward the acknowledgment signal to the alarm control signal origination device.

11. The apparatus of claim 9, wherein the network interface is further configured to forward the acknowledgment signal to one or more distributors communicably linked between the alarm device and the alarm control signal origination device, each distributor being configured to receive the acknowledgment signal from the alarm device and forward the acknowledgment signal to the alarm control signal origination device.

12. A method of processing an alarm control signal in an alarm device, comprising:
   receiving an alarm control signal indicating that an alarm issuance to a target is requested;
   detecting whether the target is proximate to the alarm device in response to the receipt of the alarm control signal;
   issuing an alarm to the target if the target is detected as being proximate to the alarm device; and
   forwarding the alarm control signal to another alarm device communicably linked to the alarm device if the target is detected as not being proximate to the alarm device.

13. The method of claim 12, further comprising: if the target is detected as not being proximate to the alarm device, then forwarding the alarm control signal to one or more distributors communicably linked between the alarm device and the other alarm device, each distributor being configured to receive the alarm control signal from the alarm device and forward the alarm control signal to the other alarm device.

14. A method of processing an alarm control signal in an alarm device, comprising:
   receiving an alarm control signal indicating that an alarm issuance to a target is requested;
   detecting whether the target is proximate to the alarm device in response to the receipt of the alarm control signal;

issuing an alarm to the target if the target is detected as being proximate to the alarm device; and receiving an acknowledgement signal indicating that the target has acknowledged the alarm.

15. The method of claim 14, wherein the alarm control signal is from an alarm control signal origination device communicably linked to the alarm device, the method further comprising: forwarding the acknowledgment signal to the alarm control signal origination device when the acknowledgment signal is received by the alarm device.

16. The method of claim 15, further comprising: forwarding the acknowledgment signal to one or more distributors communicably linked between the alarm device and the alarm control signal origination device, each distributor being configured to receive the acknowledgment signal from the alarm device and forward the acknowledgment signal to the alarm control signal origination device.

17. The method of claim 14, the method further comprising:

assigning a state value of alarm pending when the alarm control signal is received; and changing a state value to alarm satisfied when the acknowledgment signal is received.

18. A computer program for processing an alarm control signal in an alarm device embodied in a computer program, the computer program comprising:

a code segment for receiving an alarm setting by a first networked alarm device capable of issuing alarms to human beings, and wherein the alarm setting is input to the first networked alarm device by a human being and is configured to cause an alarm to be issued at a specified time, as determined on the basis of a clock and for the purpose of notifying the human being the that the specified time has arrived;

a code segment for determining, at the specified time, whether the human being is detected proximate to the first networked alarm device;

a code segment for issuing an alarm from the first networked alarm device to the human being if the human being is proximate to the first networked alarm device and, if the human being is not proximate to the first networked alarm device, issuing an alarm control signal over a network connection indicating that an alarm issuance to the human being is requested;

a code segment for receiving the alarm control signal;

a code segment for determining whether the human being is detected proximate to the alarm device in response to the receipt of the alarm control signal; and a code segment for issuing an alarm from the second networked alarm device to the human being if the human being is determined to be proximate to the second networked alarm device.

19. A computer program for processing an alarm control signal in an alarm device embodied in a computer program, the computer program comprising:

a code segment for receiving an alarm control signal indicating that an alarm issuance to a target is requested; and a code segment for detecting whether the target is proximate to the alarm device in response to the receipt of the alarm control signal; and a code segment for forwarding the alarm control signal to another alarm device communicably linked to the alarm device if the target is detected as not being proximate to the alarm device.

20. The computer program of claim 19, further comprising: a code segment for forwarding the alarm control signal to one or more distributors communicably linked between the alarm device and the other alarm device, each distributor being configured to receive the alarm control signal from the alarm device and forward the alarm control signal to the other alarm device, if the target is detected as not being proximate to the alarm device.

21. A computer program for processing an alarm control signal in an alarm device embodied in a computer program, the computer program comprising:

a code segment for receiving an alarm control signal indicating that an alarm issuance to a target is requested; and a code segment for detecting whether the target is proximate to the alarm device in response to the receipt of the alarm control signal; and a code segment receiving an acknowledgement signal indicating that the target has acknowledged the alarm.

22. The computer program of claim 21, wherein the alarm control signal is from an alarm control signal origination device communicably linked to the alarm device, the computer program further comprising: a code segment for forwarding the acknowledgment signal to the alarm control signal origination device when the acknowledgment signal is received by the alarm device.

23. A clustered alarm system, comprising:

an alarm control signal origination device for originating an alarm control signal;

a detector for detecting a target; and one or more alarm devices communicably linked to the alarm control signal origination device, each alarm device comprising:

a network interface configured to receive the alarm control signal;

an alarm interface for issuing an alarm to a target; and a processing unit which, upon receiving the alarm control signal, executes alarm issuing instructions causing the alarm interface to issue the alarm; and wherein the processing unit is configured to execute the alarm issuing instructions when the detector detects the target; and wherein the detector is a component of at least one of the one or more alarm devices.

24. A clustered alarm system, comprising:

an alarm control signal origination device for originating an alarm control signal;

a detector for detecting a target; and one or more alarm devices communicably linked to the alarm control signal origination device, each alarm device comprising:

alarm interface for issuing an alarm to a target;

a network interface configured to receive the alarm control signal and further configured to receive an acknowledgment signal indicating that the target has acknowledged the alarm; and a processing unit which, upon receiving the alarm control signal, executes alarm issuing instructions causing the alarm interface to issue the alarm; and wherein the processing unit is configured to execute the alarm issuing instructions when the detector detects the target.

25. A clustered alarm system, comprising:

a plurality of networked alarm devices communicably linked to one another and each programmable, by a human being, with alarm entries to cause the networked alarm devices to issue alarms at specified times;

a detector for detecting a proximity of human beings responsible for inputting alarm entries into respective ones of the plurality of networked alarm devices; and a processing unit configured to cause a selected one of the plurality of networked alarm devices to issue an alarm at a time specified by a specific input alarm entry on the basis of proximity, as determined by the detector, to a human being responsible for inputting the specific input alarm entry.

26. The system of claim 25, further comprising one or more distributors communicably linked between the plurality of networked alarm devices, each distributor being configured to receive alarm control signals from individual ones of the plurality of networked alarm devices and forward the alarm control signals to others of the plurality of networked alarm devices, the alarm control signals operating to configure the processing unit to cause selected ones of the plurality of networked alarm devices to issue alarms on the basis of proximity to the human being responsible for setting the respective alarm.

* * * * *

UNITED STATES PATENT AND TRADEMARK OFFICE
CERTIFICATE OF CORRECTION

PATENT NO. : 6,741,173 B2
DATED : May 25, 2004
INVENTOR(S) : Richard Dean Dettinger et al.

It is certified that error appears in the above-identified patent and that said Letters Patent is hereby corrected as shown below:

<u>Column 7,</u>
Line 10, "processing en alarm" should be -- processing alarm --,
Lines 12 and 41, "selling" should be -- setting --,
Line 48, "en the alarm to a-target human" should be -- the alarm to human --.

Signed and Sealed this

Thirtieth Day of November, 2004

JON W. DUDAS
*Director of the United States Patent and Trademark Office*